(12) United States Patent
Hall

(10) Patent No.: US 7,035,499 B1
(45) Date of Patent: Apr. 25, 2006

(54) ON/OFF OPTICAL SWITCHING USING COMBINED ACOUSTO-OPTIC AND ELECTRO-OPTIC SWITCHES

(75) Inventor: David B. Hall, La Crescenta, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/083,731

(22) Filed: Mar. 18, 2005

(51) Int. Cl.
*G02B 6/35* (2006.01)

(52) U.S. Cl. .............................. 385/16; 385/1

(58) Field of Classification Search ............ 385/1, 385/2, 7, 8, 16
See application file for complete search history.

(56) References Cited

U.S. PATENT DOCUMENTS

| | | |
|---|---|---|
| 5,448,058 A | 9/1995 | Arab-Sadeghabadi et al. |
| 5,751,868 A * | 5/1998 | Bala et al. ............... 385/16 |
| 5,852,507 A | 12/1998 | Hall |

OTHER PUBLICATIONS

Nakajima, H., Development on Guided-Wave Switch Arrays, IEICE Trans. Electron, Feb. 1999, pp. 297-304, vol. E82, No. 2, Japan.

Kirkendall, et al., Overview of High Performance Fibre-Optic Sensing, Journal of Physics, Sep. 2004, pp. R197-R216, United Kingdom.

* cited by examiner

*Primary Examiner*—John D. Lee
(74) *Attorney, Agent, or Firm*—Patti & Brill, LLC

(57) ABSTRACT

A light beam on a single optic fiber carries time division multiplexed information originating from multiple sensors driven from a single light source. An optical switch apparatus coupled in series between the source and the sensors switches the light beam of the source between ON and OFF states. The switch apparatus includes an electro-optic switch and an acousto-optic switch coupled in series with the electro-optic switch. A controller and drivers for the electro-optic and acousto-optic switches produce in an appropriate time sequence control signals resulting in a desired ON and OFF time of the light beam being switched.

20 Claims, 2 Drawing Sheets

ON/OFF OPTICAL SWITCHING USING COMBINED ACOUSTO-OPTIC AND ELECTRO-OPTIC SWITCHES

CROSS-REFERENCE TO RELATED APPLICATION

This application contains subject matter that is related to the subject matter of the following application, which is assigned to the same assignee as this application. The below-listed application is hereby incorporated herein by reference in its entirety:
"ELECTRO-OPTIC SWITCHING APPARATUS NOT REQUIRING DC BIAS," by Dr. David B. Hall and Mr. Carl Bathelt, Ser. No. 11/083,736, filed concurrently herewith.

TECHNICAL FIELD

The invention relates generally to optical switches and more particularly to optical switches capable of significant ON to OFF attenuation ratios.

BACKGROUND

Time division multiplex (TDM) architectures often demand data at high throughput sampling rates. Such architectures often use a low duty cycle optical ON/OFF switch with fast rise and fall times to generate a stream of pulses. Because of the high coherence of the laser source, leakage light caused by the incomplete turn-OFF of the optical switch can produce excessive phase noise at the receiver and drastically reduce the overall signal-to-noise ratio. This may be due to bleed-through light during the OFF time interval of a single optical source causing unwanted signal output from a plurality of sensors all driven by the light output from the same optical source. This may be a problem where there are a large number of optical light sources in the system producing stray and/or bleed-through light that contaminates the desired light signal traveling in an optical fiber in a given time slot in the TDM system.

The required ON/OFF attenuation ratio for an optical switch increases with the number of sensors driven by the light from a single optical source and with the number of laser sources that generate light beams that are switched through the fiber. For example, fiber optic acoustic sensor systems, such as using a plurality of Mach Zehnder interferometers, may operate from a light beam from a single laser source and employ a single fiber-optic "return" path where the output from each interferometer is time division multiplexed onto the return path. A plurality of multiplexed signals carried by a single fiber in such a system gives rise to the need for an optical switch with a significant OFF attenuation factor. For such a system using 64 sensors with 64 corresponding TDM light outputs, the required OFF attenuation for the switch is 60–75 dB to maintain a good signal to noise ratio. A known approach to achieve this requirement has been to use a pair of expensive lithium niobate electro-optic switches connected in series in order to achieve the needed OFF attenuation. There exists a need for a cost-effective way to provide optical switching that can satisfy the requirements of such a system.

SUMMARY

It is an object of the present invention to provide an optical switch that satisfies this need.

The invention in one implementation encompasses an optical switching apparatus. The apparatus includes an electro-optic switch connected in series with an acousto-optic switch. A signal input of one of said switches receives an input light beam from a corresponding optical transmitter and a signal output of the other of the switches is coupled to the single optic fiber that carries the switched light beam. The sum of the switching transition times required for the apparatus to turn from OFF to ON and from ON to OFF being substantially less, e.g. preferably less than 5%, of the OFF time interval of the apparatus. This permits the higher attenuation level of the acousto-optic switch in combination with faster switching speed of the electro-optic switch to be combined to form a cost effective optical switching apparatus with desired characteristics.

DESCRIPTION OF THE DRAWINGS

Features of exemplary implementations of the invention will become apparent from the description, the claims, and the accompanying drawings in which:

DETAILED DESCRIPTION

Figure 1:
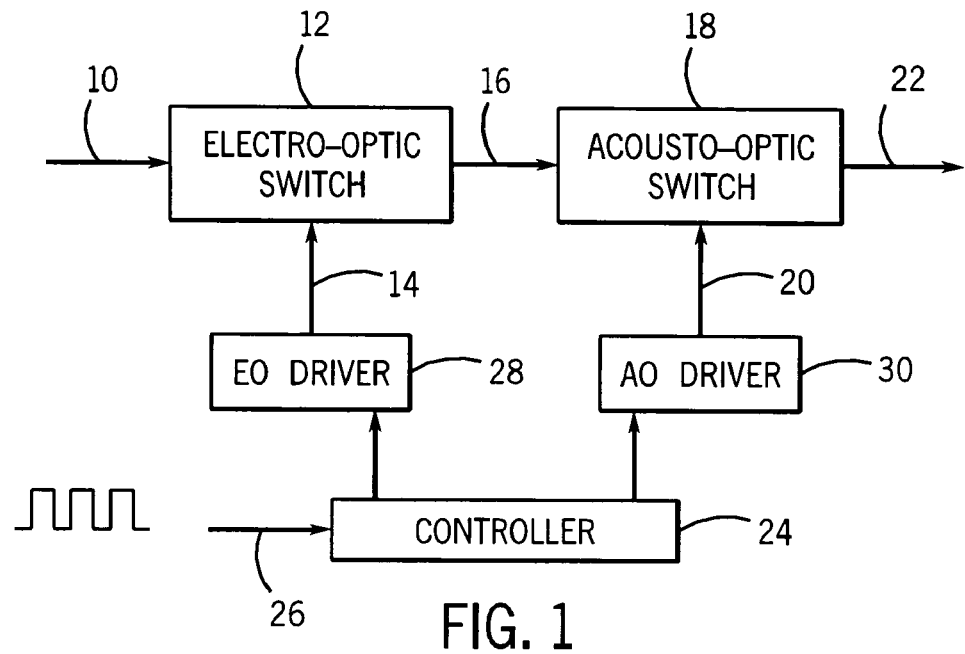
FIG. 1 is a representation of one implementation of an apparatus that comprises an optical switch in accordance with the present invention.

FIG. 1 illustrates an embodiment of the present invention in which it is desired to provide optical switching of a light beam carried by optical fiber 10. An electro-optic (EO) switch 12 receives the input light beam from fiber 10 and provides ON/OFF switching in response to a control signal provided an input 14. The electro-optic switch 12 may comprise an electro-optic switch available from switch supplier JDS Uniphase. The switched output of electro-optic switch 12 is carried by optical fiber 16 and serves as an input to acousto-optic (AO) switch 18 which may comprise an acousto-optic switch available from switch suppliers Brimrose or Isomet. A control signal carried at input 20 of the acousto-optic switch 18 controls the ON/OFF switching of the switch. The switched output is carried by optical fiber 22.

A controller 24 receives an input (clock signal) 26 representative of the desired ON and OFF duty cycle for switching the light beam on fiber 10. The generator creates ON/OFF control signals that control EO driver 28 and AO driver 30 that provide appropriate ON and OFF gating signals on inputs 14 and 20 for electro-optic switch 12 and acousto-optic switch 18, respectively. The signal, e.g. a series of pulses having first and second voltage levels, received on input 26 will typically be generated by a system clock (not shown) associated with the TDM system. The control signal supplied to inputs 14 and 20 will vary depending upon the required type of input signal required by each switch. For example, the signal supplied as input 20 for the acousto-optic switch 18 may comprise a frequency modulated control signal to produce a corresponding acoustic wave in a crystal or other piezoelectric material utilized as the active switching element in the acousto-optic switch. The signal supplied as input 14 for the electro-optic switch 12 may comprise an electrical signal utilized to produce and control the magnitude of an electrical field that in turn controls the active optical switching element in the electro-optic switch. AO and EO drivers for controlling the switching of such optical switches are known. Specific timing requirements concerning the generation of the ON and OFF control signals for each switch are discussed below.

Using an AO switch in series with an EO switch results in a cost-effective optical switching arrangement that can be constructed with commercially available off the shelf switches for switching applications requiring substantial attenuation during OFF times and having total rise and fall times that are only a small percentage of either the ON or OFF times. The EO switch has relatively fast rise and fall times (2 nanoseconds "ns") and a moderate OFF attenuation level (25 decibels "dB"). The AO switch is generally complementary to the EO switch in regard to its characteristics. The AO switch has slower rise and fall times (20 ns) but a substantially greater OFF attenuation level (50 dB). The indicated levels of attenuation are exemplary. In general, the EO and AO switches may provide attenuation of 15–25 dB and 35–50 dB, respectively.

Figure 2:
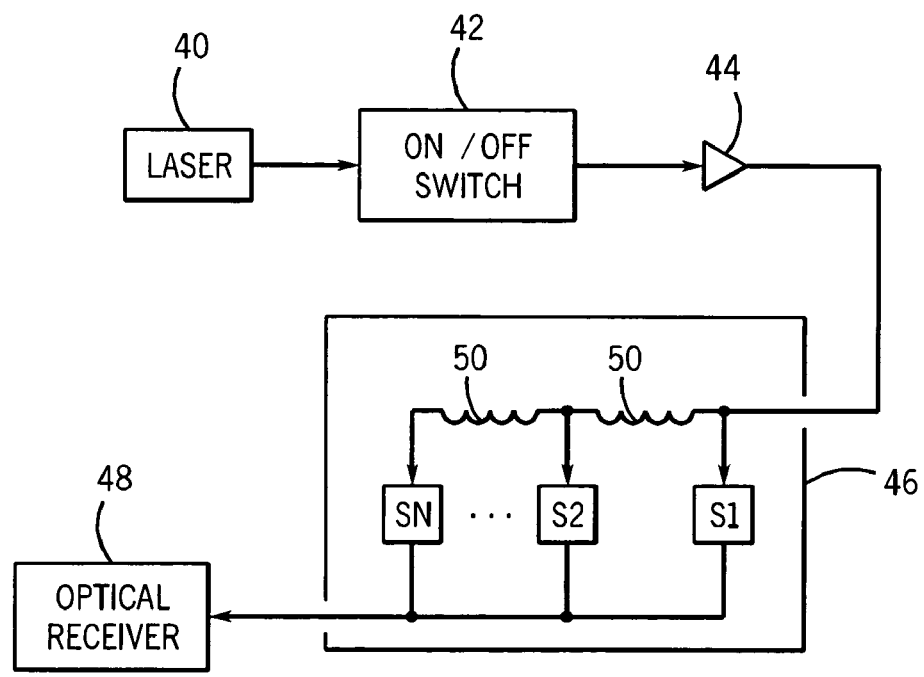
FIG. 2 is a block diagram of an exemplary system employing an ON/OFF optical switch.

FIG. 2 shows an exemplary system incorporating an optical switch such as described in FIG. 1. A laser 40 supplies a light beam input to ON/OFF optical switch 42 that provides its switched output to an optical amplifier 44. An array of sensors 46 receives the amplified light output from amplifier 44 as an input and provides a TDM series of outputs that are transmitted to optical receiver 48. The array of sensors 46 may comprise a plurality of individual sensors S1, S2 . . . SN that each receives the switched light input delayed in time by delay elements 50. The input light pulse is delayed in time relative to each sensor in order to produce a sequential series of output pulses that do not overlap in time. Each of the illustrated sensors may comprise an interferometer that functions as an acoustic sensor.

Figure 3:
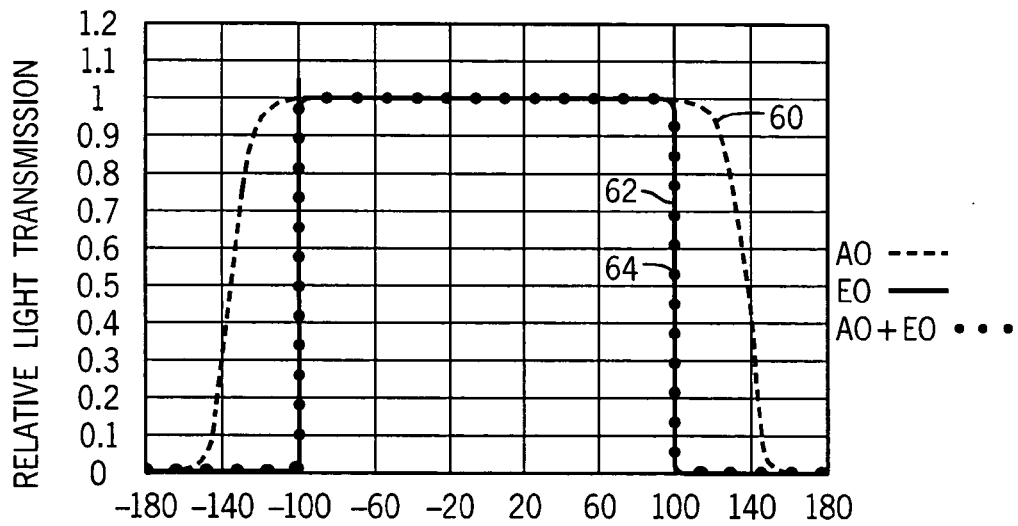
FIGS. 3 and 4 are graphs illustrating the switching times and attenuation levels achieved by the optical switch as shown in FIG. 1.
Figure 4:
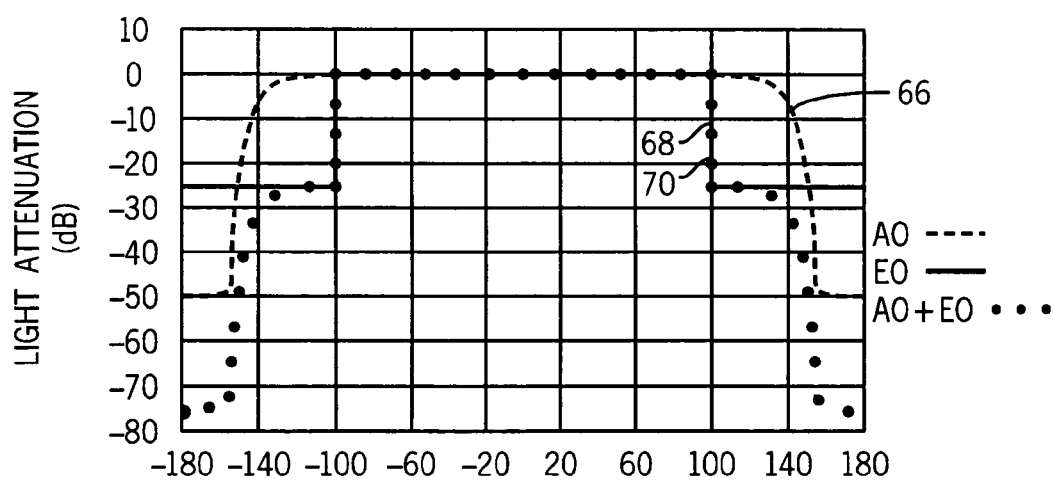

FIGS. 3 and 4 are graphs illustrating the individual switched outputs of an AO switch, an EO switch, and the total switching output of the switching arrangement as shown in FIG. 1. As indicated in the keys of these figures, the output response of the AO switch is shown as a dashed line, the output response of the EO switch is shown as a solid line, and the total output response for the switching arrangement of FIG. 1 is shown as a dotted line. The individual switch characteristics are explained for each switch as if the subject switch was the only switch being tested. The output response of the AO switch is in response to a 280 ns control pulse centered about T(0). The output response of the EO switch is in response to a 200 ns control pulse centered about T(0).

FIG. 3 shows the output response 60 of the AO switch, output response 62 of the EO switch and the combined response 64 of the AO and EO switches. These outputs are shown in FIG. 3 on a linear amplitude (attenuation) vertical scale. As seen in this scale, the response 62 of the faster EO switch is substantially the same as the combined output response 64. To better appreciate the contribution made by the AO switch, the output responses should be viewed with a vertical scale having greater dynamic range; see FIG. 4. The 10% to 90% rise and fall times are approximately 2 ns for the EO switch and 20 ns for the AO switch. The time required for state transitions by the AO switch is greater than 5 times that for the EO switch.

As seen in FIG. 4, the AO switch provides an OFF attenuation level of 50 dB relative to an ON level of 0 dB in response 66. The EO switch provides an OFF attenuation level of 25 dB relative to an ON level of 0 dB in response 68. The total switching characteristic for the switch combination as shown in FIG. 1 is depicted as dotted line 70. This ON/OFF response characteristic reflects the summation of the individual characteristics for the AO switch and EO switch as explained above. Assuming the control pulses are applied to the respective switches as described above, the switch arrangement provides an OFF attenuation level of 75 dB relative to an ON level of 0 dB. It will be apparent that the ON level of 0 dB is only a reference level and that some amount of actual insertion loss will be incurred during the ON state. It takes approximately 60 ns for the combined switch to transition between ON and OFF states. It will be seen that from approximately −120 ns to +120 ns the cumulative switch output 70 is approximately the same as the EO switch output 68. This is because this time frame falls within the ON time cycle of the AO switch. At approximately −130 ns to +130 ns the rising and falling edges of the AO switch began to contribute to the cumulative attenuation. The timing of the control pulses as generated by the controller 24 plays an important role in the overall operation of the switch combination is shown in FIG. 1. For example, because the acousto-optic switch has a slower response time than the electro-optic switch, the control signal to the acousto-optic switch must start earlier than the control signal to the electro-optic switch so that both switches are in an ON state at the desired ON start time.

The controller 24 may comprise available digital circuitry such as shift registers and control gates connected to supply the required timing of the control signals for the switches.

Alternatively, controller 24 may comprise a microprocessor and operate under control instructions to generate the required timing for the control signals for the switches.

FIG. 2 shows the switching apparatus of FIG. 1 utilized in a time division multiplexed system. In accordance with TDM techniques, only one output pulse from one of the sensors is to be transmitted at any given time. While the switch is in the OFF state, it must provide sufficient attenuation to prevent significant amounts of the light bleed-through from reaching the sensors. Such bleed-through light represents noise that will degrade the signal-to-noise ratio. When sensor S2 is receiving the switched light pulse and generating a corresponding output pulse containing encoded sensor information, the other sensors should ideally be receiving no light and hence producing no outputs. Any bleed-through light during the OFF state of the optical switch will cause the other sensors to produce an undesired output that functions as noise concurrent with the output of S2.

In an exemplary TDM system the illustrative optic switching arrangement of FIG. 1 is desired to be ON for approximately 200 ns and OFF for 10 microseconds (10,000 ns). During the OFF to ON transition for time from −160 to −100 (60 ns) and for a similar interval for the ON to OFF transition, the switch provides an attenuation level of less than 75 dB. For this example, the ON time is defined from time −100 ns to +100 ns. The OFF cycle time with less than 75 dB of attenuation is 120 ns/10,000 ns=1.2%. This percentage of time should be less than 20% and preferably less than 5% to minimize adverse impact on the signal to noise level. Further, it should be remembered that even during almost all of this 120 ns transition time at least 25 dB of attenuation is being provided. The 1.2% of the total OFF time having less than 75 dB of attenuation has a negligible impact on system performance. For systems having an OFF time that is substantially longer, e.g. 10 times longer, than the cumulative times for state transitions of the switch arrangement as shown FIG. 1, the combination of an AO switch in series with an EO switch behaves substantially like a single EO switch with an attenuation level of 75 dB. This of course requires that the control input of the AO switch receive a control pulse that is longer than and overlaps in time duration the control pulse delivered to the EO switch so that the AO switch is fully ON at the time the EO switch transitions from OFF to ON and from ON to OFF.

The exemplary optical switch of the present invention utilizes a single EO switch in combination with an AO switch to provide a cost effective optical switch that satisfies a required attenuation level in a TDM system. The performance of the system, especially with regard to noise caused by bleed-through light, is maintained at a high level since a maximum required attenuation level is provided for substantially all of the OFF system time. This provides a cost-effective solution as compared with one or more custom chips containing integrated optical switches as utilized in the past.

Although an exemplary implementation of the invention has been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An optical switching apparatus adapted to provide ON and OFF switching of a light beam in a time division multiplexed system having predetermined ON and OFF time intervals of the light beam, comprising:
    an electro-optic switch;
    an acousto-optic switch coupled in series with the electro-optic switch, a signal input of one of said switches receiving the light beam and a signal output of the other of the switches carrying the switched light beam;
    the electro-optic and acousto-optic switch having combined switching transition times required for the apparatus to turn from OFF to ON and from ON to OFF of less than 5% of the OFF time interval between pulses of light being switched by the apparatus.

2. The apparatus of claim 1 wherein the combined transition times required for the apparatus to turn from OFF to ON and from ON to OFF is less than 2% of the OFF time interval between pulses of light being switched by the apparatus.

3. The apparatus of claim 1 wherein the system requires a minimum attenuation level during the OFF state, the combination of the attenuation levels in the OFF states provided by the electro-optic and acousto-optic switches satisfying the minimum attenuation level, neither the attenuation level provided by electro-optic switch nor the acousto-optic switch individually satisfying the required minimum attenuation in the OFF state.

4. The apparatus of claim 3 wherein the electro-optic switch and the acousto-optic switch have first and second switching times, respectively, where the switching time is the time required for a switch to transition from one of the ON and OFF states to the other of the ON and OFF states, the second switching time being at least 5 times larger than the first switching time.

5. The apparatus of claim 4 wherein the electro-optic switch and the acousto-optic switch have respective first and second control inputs adapted for receiving corresponding first and second control signals that determine whether the respective switches are in an ON or OFF state.

6. The apparatus of claim 5 further comprising a controller adapted to generate first and second control signals for controlling the ON and OFF states of the electro-optic switch and acousto-optic switch, respectively, and driver devices coupled respectively to each switch that provides a required ON/OFF drive signal to the respective switch in response to the first and second control signals, respectively, where an ON state of the apparatus is controlled by an ON state of the first and second control signals where the transition from the OFF to the ON state of the first and second control signals is initiated at substantially different times relative to each other.

7. The apparatus of claim 6 wherein the controller generates the second control signal that begins substantially earlier in time relative to the desired ON start time of the apparatus than the first control signal, the starting time of the second control signal causing the OFF to ON transition state of the acousto-optic switch to begin prior to the desired initial ON state of the apparatus by an amount of time related to the time required for the acousto-optic switch to transition from the OFF state to the ON state.

8. The apparatus of claim 7 wherein the controller generates the first control signal used to control the electro-optic switch with the OFF to ON state beginning later in time relative to the second control signal, the starting time of the first control signal causing the OFF to ON transition state of the electro-optic switch to begin prior to the desired initial ON state of the apparatus by an amount of time related to the time required for the electro-optic switch to transition from the OFF state to the ON state.

9. The apparatus of claim 3 wherein the required minimum attenuation during the OFF state of the apparatus is about 75 decibels.

10. The apparatus of claim 9 wherein the attenuation during the OFF state of the acousto-optic switch and electro-optic switch are about 50 and 25 decibels, respectively, resulting in a total attenuation during the OFF state of about 75 decibels.

11. In a time division multiplexed system having a plurality of optically driven sensors all driven from a single light origination transmitter where each sensor generates a light beam carrying respective information in different time slots on a single output optic fiber, an optical switching apparatus coupled in series with the transmitter and adapted to provide ON and OFF switching of the light from the transmitter carried on an input optic fiber to the sensors, the optical switching apparatus comprising:
    an electro-optic switch;
    an acousto-optic switch coupled in series with the electro-optic switch, a signal input of one of said switches receiving an input light beam from a corresponding optical transmitter and a signal output of the other of the switches coupled to the input optic fiber that carries the switched light beam to the sensors;
    the electro-optic and acousto-optic switch having combined switching transition times required for the apparatus to turn from OFF to ON and from ON to OFF of less than 5% of the OFF time interval between pulses of light being switched by the apparatus.

12. The apparatus of claim 11 wherein the combined transition times required for the apparatus to turn from OFF to ON and from ON to OFF is less than 2% of the OFF time interval between pulses of light being switched by the apparatus.

13. The apparatus of claim 11 wherein the system requires a minimum attenuation level during the OFF state, the sum of the attenuation levels in the OFF states provided by the electro-optic and acousto-optic switches satisfying the minimum attenuation level, neither the attenuation level provided by electro-optic switch nor the acousto-optic switch individually satisfying the required minimum attenuation in the OFF state.

14. The apparatus of claim 13 wherein the electro-optic switch and the acousto-optic switch have first and second switching times, respectively, where the switching time is the time required for a switch to transition from one of the ON and OFF states to the other of the ON and OFF states, the second switching time being at least 5 times larger than the first switching time.

15. The apparatus of claim 14 wherein the electro-optic switch and the acousto-optic switch have respective first and second control inputs adapted for receiving corresponding first and second control signals that determine whether the respective switches are in an ON or OFF state.

16. The apparatus of claim 15 further comprising a controller adapted to generate first and second control signals for controlling the ON and OFF states of the electro-optic switch and acousto-optic switch, respectively, and driver devices coupled respectively to each switch that provides a required ON/OFF drive signal to the respective switch in response to the first and second control signals, respectively, where an ON state of the apparatus is controlled by an ON state of the first and second control signals where the transition from the OFF to the ON state of the first and second control signals is initiated at substantially different times relative to each other.

17. The apparatus of claim 16 wherein the controller generates the second control signal that begins substantially earlier in time relative to the desired ON start time of the apparatus than the first control signal, the starting time of the second control signal causing the OFF to ON transition state of the acousto-optic switch to begin prior to the desired initial ON state of the apparatus by an amount of time related to the time required for the acousto-optic switch to transition from the OFF state to the ON state.

18. The apparatus of claim 17 wherein the controller generates the first control signal used to control the electro-optic switch with the OFF to ON state beginning later in time relative to the second control signal, the starting time of the first control signal causing the OFF to ON transition state of the electro-optic switch to begin prior to the desired initial ON state of the apparatus by an amount of time related to the time required for the electro-optic switch to transition from the OFF state to the ON state.

19. The apparatus of claim 13 wherein the required minimum attenuation during the OFF state of the apparatus is about 75 decibels.

20. The apparatus of claim 19 wherein the attenuation during the OFF state of the acousto-optic switch and electro-optic switch are about 50 and 25 decibels, respectively, resulting in a total attenuation during the OFF state of about 75 decibels.

* * * * *